United States Patent [19]
Irwin et al.

[11] Patent Number: 6,058,644
[45] Date of Patent: May 9, 2000

[54] APPARATUS FOR OSCILLATING WING PARTS OF AN INSECT LIKE FISH LURE

[76] Inventors: Guy L. Irwin, 512 Oreland Mill Rd., Oreland, Pa. 19075; Paul T. Basso, 341 Vincent Ave., Lynbrook, N.Y. 11563; Frank Salsone, 619 Baldwin Ave., Baldwin, N.Y. 11510

[21] Appl. No.: 09/385,728

[22] Filed: Aug. 30, 1999

[51] Int. Cl.⁷ .................................................. A01K 85/00
[52] U.S. Cl. ........................................... 43/42.27; 43/26.2
[58] Field of Search .............................. 43/42.27, 42.26, 43/26.1, 26.2

[56] References Cited

U.S. PATENT DOCUMENTS

| | | |
|---|---|---|
| 2,472,505 | 6/1949 | Yocam ........................................ 43/26.2 |
| 3,791,064 | 2/1974 | Van Iseghem, Jr. ...................... 43/26.2 |
| 4,581,841 | 4/1986 | Gish ......................................... 43/26.2 |
| 5,105,573 | 4/1992 | Mays ........................................ 43/17.1 |
| 5,694,714 | 12/1997 | Basso ....................................... 43/26.2 |

*Primary Examiner*—Jack W. Lavinder

[57] ABSTRACT

A fish lure simulative of a live insect has a resilient push frame which on a deflection thereof by a cam engaging the push frame, flexes wing parts of the lure upwardly, a release of the cam engagement allowing a bias present in the deflected push frame to restore it to a rest position, the wing parts being flexed downwardly to a complete the wing oscillation during restoration travel of the push frame. Oscillations at different amplitudes also can be produced by using camming surfaces on the cam which have different cam throws.

17 Claims, 3 Drawing Sheets

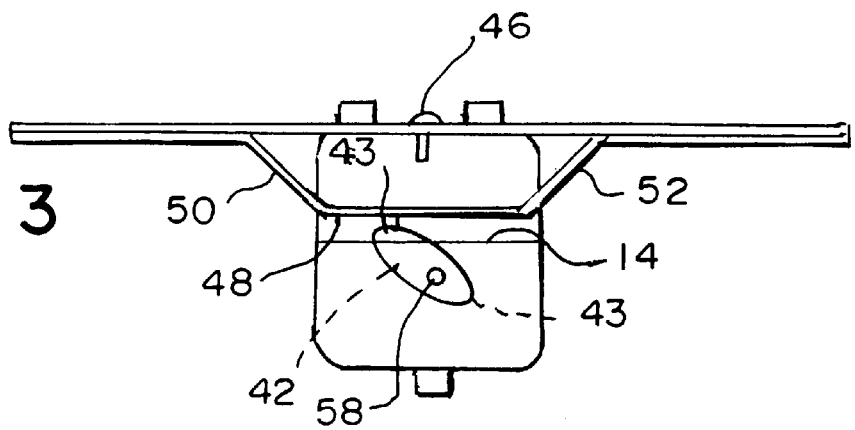
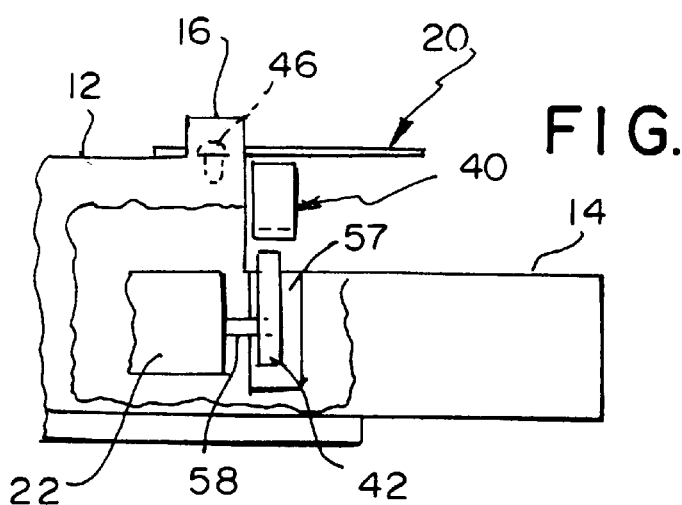
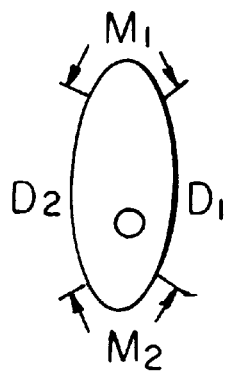
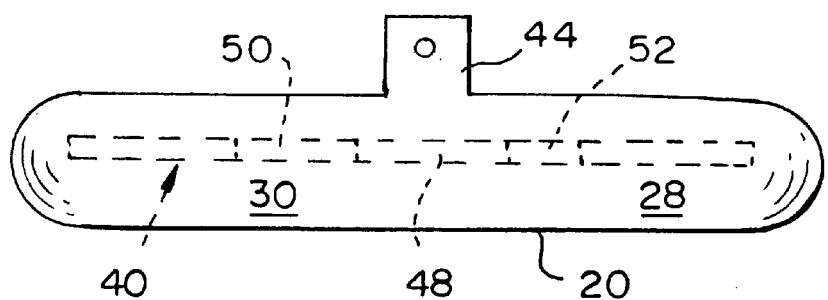
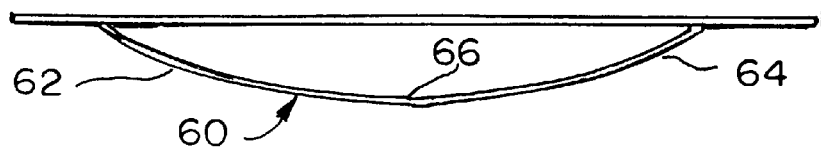

APPARATUS FOR OSCILLATING WING PARTS OF AN INSECT LIKE FISH LURE

BACKGROUND OF THE INVENTION

The present invention relates to an insect like fish lure and, more particularly, to apparatus for oscillating wing parts mounted on a body of the fish lure so as to simulate live insect activity with the lure.

Fish lures fashioned in the form of an insect and in which insect wings can be flexed in simulation of live insect activity are known. Mechanism used for producing wing flexing or oscillations in known lure constructions is often complicated and costly to install in or on the body of the lure. Such drawbacks lead to bulky lure size and little commercial viability particularly so because the fisherman is interested in using a lure which assimilates a live insect as much as possible.

Another shortcoming of lures with flexing wings is the limitation of wing oscillations at a same one amplitude oscillation rate. Such simulated insect action is less desirable in terms of approaching live insect wing activity because many insects flex their wings in a pattern wherein more than one amplitude of oscillations is regularly exhibited by the insect.

Accordingly, it is desirable that a fish lure be provided in which wing oscillations are produced with simply constructed means for doing this and further, that the lure embody means for producing oscillations of more than one amplitude of wing flexing simulation, and without need to make any change, substitution or adjustment in the said oscillation producing means.

OBJECTS AND SUMMARY OF THE INVENTION

Accordingly, it is an object of the invention to provide a apparatus for flexing wing parts of an insect like lure which overcomes the drawbacks of the prior art.

It is a further object of the invention to provide an insect like fish lure the wing parts of which can be oscillated at two or more different oscillation amplitudes.

It is a still further object of the invention to provide a fish lure in which wing parts are oscillated using a resilient push frame which when subjected to a deflection force effect, causes upward flexing of the wing parts, and a bias condition imposed on the push frame during deflection effects downward wing parts flexing on release of the deflection force from the push member.

In accordance with the invention, an insect like fish lure such as one imitative of a diamond needleback is provided with a wing structure pivot mounted intermediate ends thereof to a lure body so as to provide wing parts extending laterally at opposite sides of the lure body. Apparatus for oscillating the wing parts of the lure to simulate live insect activity includes a resilient push frame disposed below the wing structure at an underface thereof, the push member including a midlength part and stringers extending from each of opposite ends of the midlength part. The midlength part is spaced from the wing structure underface and the stringers are angled upwardly from the midlength part to points where they are fixed to the wing structure underface distal the pivot mounting location.

Means such as a rotary camming member is provided to intermittently engage the push member to biasingly deflect it from a normal rest position thereof toward the wing structure underface and therewith transmit upward flexing movement to the wing parts. On a release of engagement of the camming member with the push member, the bias condition of the push member serves to transmit downward flexing movement to the wing parts as the push member returns to rest position, this completing a cycle of oscillation of the wing parts.

Deflecting of the push member is with at least one camming surface on the camming member that will engage the push member once during each one rotation, release of engagement of that camming surface with the push member being when a cam dwell surface of the camming member passes spaced from the push member. The camming member can be mounted on a shaft rotatably supported in the lure body and driven by an electric battery powered drive motor housed in the lure body.

The camming member can have at least one further camming surface thereon and at least one further dwell surface so that during each rotation of such member, two discrete cycles of wing parts oscillation can be produced. By providing that the respective one and further camming surfaces effect different magnitudes of deflection in the push member, two complete cycles of wing parts oscillation occur for each camming member rotation and will be of amplitudes that are different one from the other.

It is possible to have camming surface and dwell surface arrangements on the camming member to allow for producing more than two discrete cycles of wing parts oscillation during a single rotation of the camming member and that this be with different produced amplitudes of each.

The wing structure advantageously is made as a relative thin flat, elongated element and of material that allows ready flexing of the wing parts. It can be of metal such as a light gauge stock, e.g., phosphorous bronze plate stock of about 0.005" thickness. It also could be made of a thermoplastic sheet material such as a polypropylene of thickness about 0.010" to about 0.015". It is important that whatever material be selected, it have good resistance to fatigue since the wing parts will be flexed countless times over an expected lure life span.

It is advantageous but not essential that the wing structure be cantilever mounted on the lure body. Such can be done by providing a tab in the wing structure extending laterally outwardly of one long side margin thereof so that the tab can be fixed to the top of the lure adjacent a stepped down front part of the lure body. This cantilever mounting with a tab unobstructedly positions the wing structure on the lure body away from any other structure of or on the lure body, and also facilitates effecting of the flexing movements of the wing parts relative to the pivoting thereof.

A feature of the invention is the simplified yet highly effective manner in which the resilient push frame functions to produce upward flexing of the wing parts. In unflexed condition, the wing structure disposes generally parallel to a horizontal datum. The resilient push frame in an embodiment thereof includes a flat midlength part which in rest position is disposed spaced below and parallel also to the wing structure and horizontal datum. Opposite ends of the midlength part have joinder with inner ends of stringer pieces extending from these midlength opposite end parts.

The stringer pieces are angulated up to and are fixed at connecting points to the underface of the two wing parts of the wing structure. When the midlength part of the pusher member is deflected upwardly, it becomes bowed and the horizontal distance spanning the points where the midlength part and stringer piece joinder to each other is shortened from that of the rest position span distance. Attending this shortening is the tendency for the horizontal span distance between the connecting points of the stringer pieces tip ends and the wing parts also to shorten. But since the stringer pieces are fixed to the wing parts, the only way shortening can occur is by the wings flexing upwardly in pivoting movement toward each other. Since the push member is a spring member, deflection of the midlength part is made in opposition to a spring bias so that on release of the deflection force, the wings flex downwardly under influence of this bias to complete the oscillation cycle.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a fragmentary side elevational view partly broken away showing mounting of the wing structure on the lure body and positioning of the rotary cam member closely below the push frame, the push frame being in a rest position and the rotary cam disengaged from the push member in a cam dwell position;

FIG. 3 is a front end elevational view of FIG. 2 with a front end portion of the lure body and end portions of the wing parts broken away, a first configuration of push frame being depicted;

FIG. 4 is a top plan view of the wing structure using the first push frame configuration;

FIG. 5 is a front elevational view of a wing structure wherein a second configuration of push frame is used;

FIG. 6 is an enlarged showing of a cam member depicting camming and dwell surfaces formed thereon and with which push frame deflection engagement and release of engagement is produced during a rotation of the cam member;

DETAILED DESCRIPTION OF THE PREFERRED EMBODIMENT

Figure 1:
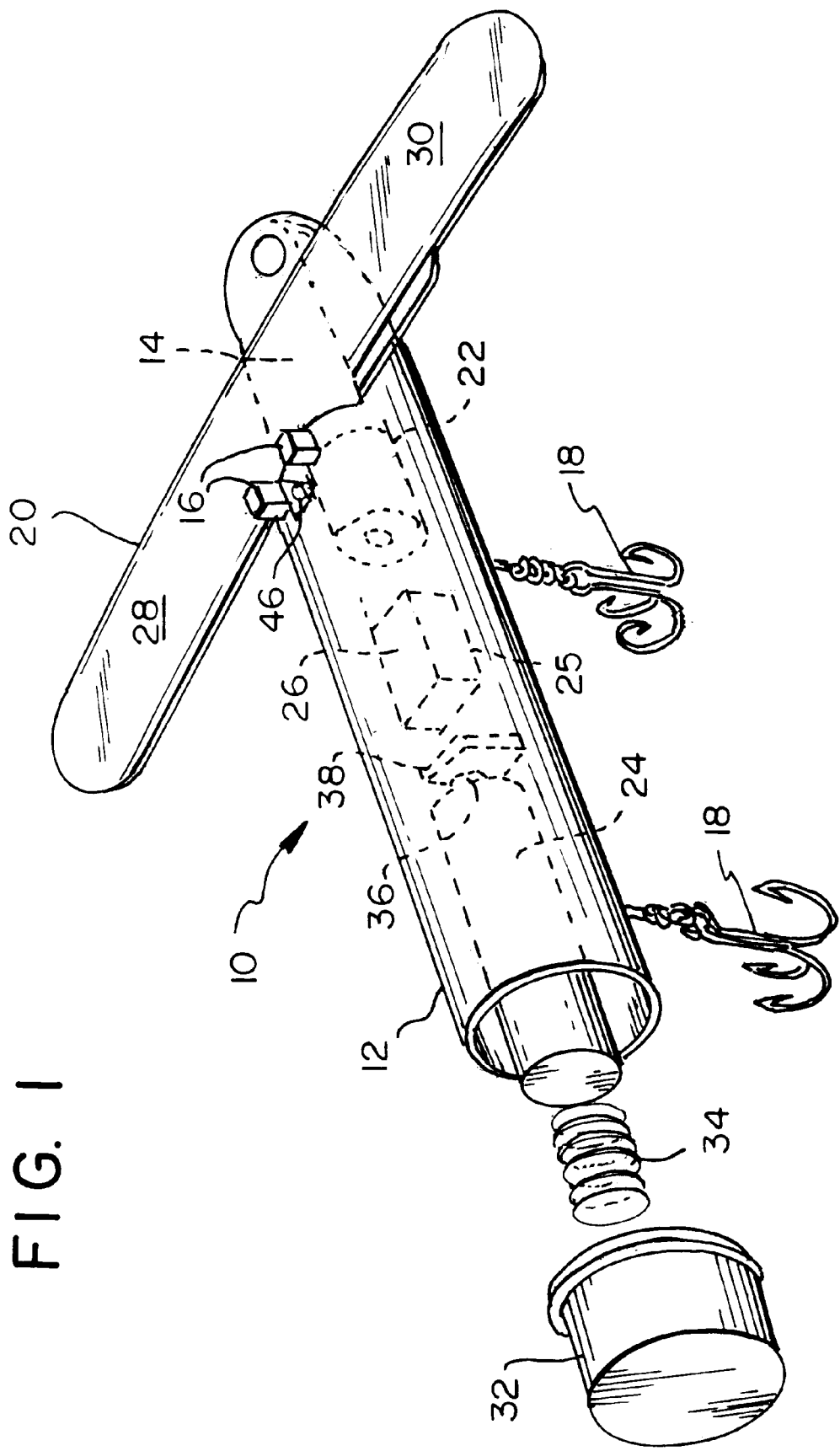
FIG. 1 is a perspective partly exploded view of a fish lure embodying apparatus for oscillating wing structure of the lure in accordance with the invention.

Referring to FIG. 1, fish lure 10 is fashioned in semblance of an insect it being known that insects alight on or hover very close to the surface of a water body wherein fish are present. The purpose is to draw a fish into striking at the lure with instinct that it is food for the fish.

In furtherance of simulating that the lure as an actual insect, the lure can be made in likeness of various ones of insect species. The FIG. 1 depiction is of a diamond needleback. Showing of other appearance features of the diamond needleback is unnecessary for description and understanding of the invention.

The lure 10 has an elongated hollow body 12 which can be made of right and left body shell parts secured together in watertight joinder. The fore part of the body can be stepped down as at 14 and on the top of the body proximal the step 14, there are a pair of spaced apart upstanding posts 16 the purpose of which will be explained later Several fish hooks 18 are carried at the body underside and wing structure 20 is fixed to the body beyond the step 14 in the manner as will be described later below.

Interiorly housed in the body are an electric drive motor 22, a battery 24 in circuit via wiring 25 with the motor, an interrupter 26 also in circuit with the battery and motor for the purpose of periodically interrupting electric power supply to the motor to disable operation of means to be described below for flexing of the wing parts 28, 30 of the wing structure 20 in oscillations simulative of real insect activity. This is in keeping with practice of certain live insect types where periodically, say every 10 seconds or so, assume a stilled wing state and do not flex the wings. Interrupter 26 could be a timer, a bistable multivibrator or other device for performing a circuit operation interruption function.

A rear end of the body is fitted with a screw or snap on type cover 32 for closing the body. Off/On control of the circuit can be with the depicted cover being screwed or pressed into the body a specified distance thereby to urge spring 34 to push the battery 24 and a terminal 36 thereof against a circuit plate terminal 38 to activate the circuit. By drawing the cover rearwardly, the terminal to terminal contact can be broken and the circuit deactivated. A common slide type on/off switch also could be used for the foregoing purpose, the switch being, e.g., located at the rear outside part of the cover.

Referring now to FIGS. 1–4, mounting of wing structure 20 to the lure body as well as description of the resilient push member 40 and the rotary cam 42 for deflecting the push member will be given.

As seen in FIG. 4, the wing structure 20 is provided with a tab 44 extending laterally of a margin of the wing structure 20 at mid length of the structure. The tab 44 is used to cantilever mount the wing structure to the lure body 12 as shown in FIG. 1, the tab being disposed between the posts 16 and fixed to the top of the lure body with a fastener screw 46. Cantilever mounting of the wing structure to the lure body facilitates flexing of the wing structure although the mounting could be made with a fastener passing through the wing structure at a location midway between the margins if, for example, it was mounted to a narrow shoulder (not shown) jutted forwardly over the body step.

Resilient push member 40 shown at rest position in FIGS. 2 and 3 is disposed at the underside of wing structure 20 and includes a thin flat midlength part 48 and flat extension pieces 50, 52 inner ends of which extend from and have juncture at points 51, 53 with opposite ends of the midlength part, the extension pieces preferably being integral with the midlength part. The extension pieces are bent angularly upwardly of the midlength part and are fixed to the underface of the respective wing parts as at connecting points 54. The extension pieces 50, 52 can have continuation lengths as at 56 which also are secured to the wing part undersurface. The continuation lengths 50, 52 can have runs ending proximal the tip ends of the wing parts.

As seen in FIGS. 2 and 3, the push member 40 is positioned above a rotary cam 42 which in turn is mounted on a drive shaft 58 of the drive motor 22, the drive shaft extending through a front partition in the lure body 12 into a slotted space 57 formed at the rear of the step 14, the rotary cam rotating in this slotted space.

Camming surface(s) or lobe(s) 43 of the rotary cam is used for intermittently engaging the push member 40 to deflect it upwardly from rest position, this deflection causing upward flexing of wing parts 28, 30. Deflection of the push member 40 is in opposition to a bias of the resilient push member so that on disengagement of the rotary cam from the push member, the bias condition therein returns it to rest position during which return, the wing parts 28, 30 flex downwardly. More detailed description of the wing part flexing movements will be given later below with reference to FIGS. 7–9.

The rotary cam 42 can be provided with one or more camming surfaces or camming lobes 43 so that during each revolution thereof, a corresponding one or more cycles of wing parts 28, 30 oscillation will be produced. The rotary cam 42 also will have a corresponding one or more surfaces that are dwell surfaces providing cam dwell wherein the cam 42 passes the push member 40 without engaging it. Further it is to be appreciated that the rotary cam will make many complete revolutions per minute, the number of such being dependent on the number of oscillations a given live insect being simulated can be expected to make. Further, wing oscillation activity can be interrupted to provide a quiescent period of no wing oscillation as occurs with live insects and for which purpose interrupter 26 is provided.

FIG. 6 depicts a rotary cam 42 having two respective camming surfaces $M_1$ and $M_2$, these being intervened by dwell surfaces $D_1$ and $D_2$. During a complete rotation of the cam 42, the push member 40 will be deflected twice by the two camming surfaces to produce two cycles of wing parts oscillation. It will be noted though that the cam throws are different, camming surface $M_1$ has a greater throw distance from the centerline of drive shaft 58 than the throw distance camming surface $M_2$ is from the centerline. The two different cam throws will produce respective greater and lesser magnitudes of deflection of the push frame 40 and correspondingly different amplitudes of the oscillations of the wing parts produced therewith.

Figure 7:
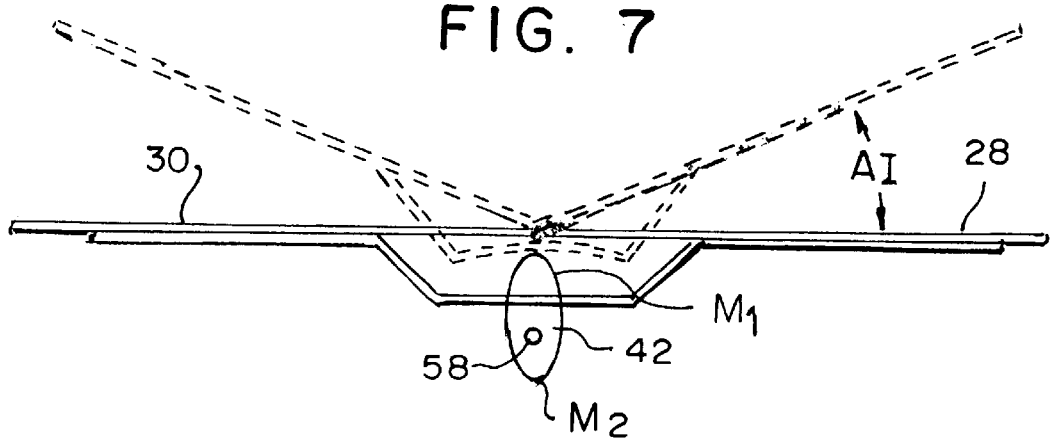
FIG. 7 is a schematic showing of a first magnitude of camming deflection of the push frame by the cam member in a rotation thereof which produces a wing oscillation cycle of wing parts of a first amplitude.
Figure 8:
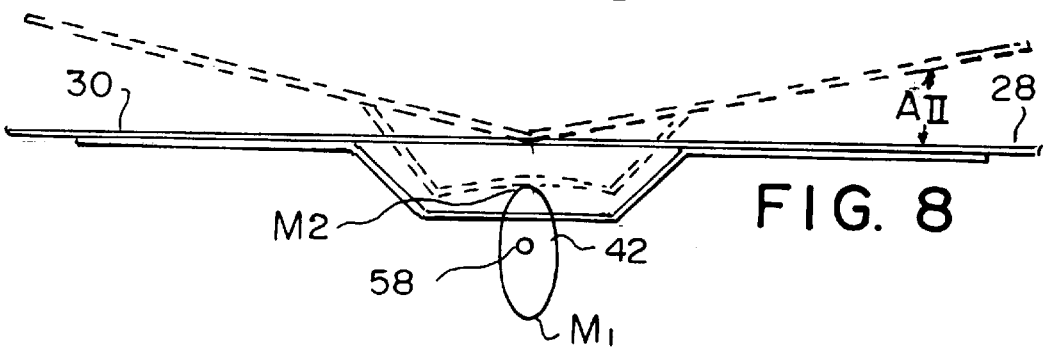
FIG. 8 is a schematic showing similar to FIG. 7 of another lesser magnitude of camming deflection of the push frame by the cam member in a rotation thereof which produces a wing parts oscillation cycle of a second lesser amplitude.
Figure 9:
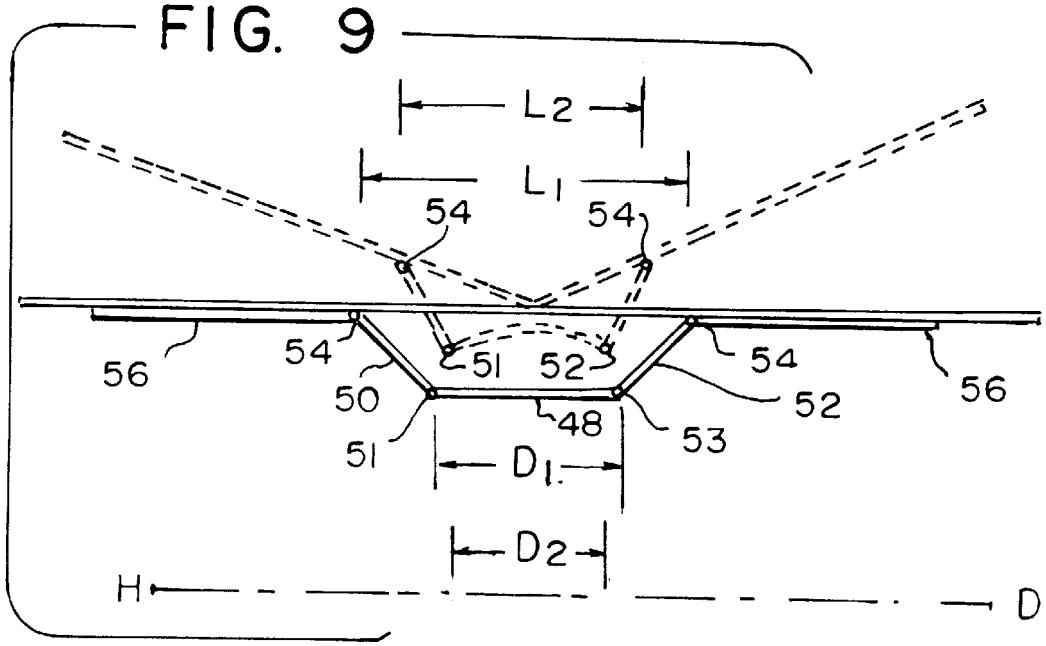
FIG. 9 is a schematic depiction of the manner of operation of the push member to produce upward flexing movement of the wing parts.

It is to be understood that the engagement of the camming surfaces with the push frame is with the midlength part 48 of the push frame as will be better understood from the discussion to be given with reference to FIGS. 7–9.

The cam 42 can be designed to have one, two or more camming surfaces. These will produce in each complete rotation of the cam 42 corresponding discrete one, two or more cycles of wing parts oscillation wherein amplitudes of the oscillation cycles can be different each from the others. The purpose for doing so is to simulate the activity of certain live insects where the insect flexes its wings at a first amplitude followed by a flexing at a second different amplitude.

If two or more camming surfaces are used on a cam 42, the RPM of drive shaft 58 will be less than that in the instance of using only one camming surface to produce one oscillation cycle per cam revolution. The number of oscillation cycles per unit of time have to be within a range of such as to be expected to be made by the insect species being simulated and, hence, the requirement for selecting drive shaft RPM to be in accord with such.

Referring now to FIG. 9, the resilient push member 40 is shown in rest position in solid lines and in maximum upwardly deflection position in dashed lines. In rest position of the push member 40, the midlength part 48 is parallel to the underface of the wing structure 20 and it also is parallel to a horizontal datum line HD and a span distance between juncture points 51, 53 where the midlength part 48 joins the extension pieces 50, 52 is $D_1$.

In rest position of the push frame, the horizontal span distance between connecting points 54 where the extension pieces 50, 52 are fixed to the wing parts 28, 30 is $L_1$.

When the camming surface $M_1$ of cam 42 engages midlength part 48 and deflects it toward the wing structure, the midlength part 48 becomes bowed and displaced upwardly. In that moved position of the midlength part 48, the horizontal span distance $D_2$ between juncture points 51, 53 becomes shortened.

The upward deflection of the midlength part 48 and shortening of the horizontal span distance thereof is accompanied by a tendency for the horizontal span distance between connecting points 54 to shorten horizontally along the wing parts length to a distance $L_2$. But because the connecting points are of fixed together structure elements, they cannot shorten on that structure. Instead, the force trying to shorten the span distance on the structure transfers as a vector force component applying a pivoting force to the wing parts causing them to flex upwardly toward each other.

During deflection upwardly of the midlength part 48 of the push member by the cam 42, the deflection is in opposition to a spring bias of the push frame so that with disengaging of the cam 42 from the midlength part 48, this bias of the push member flexes the wing parts downwardly, at the end of such flexing, the push member having returned to rest position.

FIGS. 7 and 8 depict the result of employing two magnitudes of throw on cam 42. Camming surfaces $M_1$ and $M_2$ are disposed at reciprocal locations on the cam so that during each revolution of the cam, two different deflections are worked on the midlength part 48 of the push member.

The greater magnitude throw of $M_1$ produces a flexing of wing parts 28, 30 to an amplitude AI while the lesser magnitude $M_2$ produces a lesser flexing at amplitude AII.

Using oscillations of two different amplitudes each complete cam revolution in the foregoing manner, produces an effect of fluttering of the lure wings akin to what happens in certain live insects and hence, heightens the reality of the wing flexing on the lure.

FIG. 5 depicts another embodiment of push member 60 which instead of having straight upwardly angulated extension pieces, has left and right arcuate curved extension pieces 62, 64 extending from a generally straight midlength part 66 to locations where tip ends of these pieces are fixed to the undersurface of the wing structure.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for oscillating wing structure of an insect like fish lure to simulate insect activity, the wing structure being pivot mounted at a location intermediate opposite ends thereof to a lure body, the wing structure having wing parts extending laterally of each of opposite sides of said lure body, the apparatus comprising, a resilient push member disposed at an underface of the wing structure, said push member including a midlength part and stringers extending from each of opposite ends of the midlength part, the midlength part being spaced from said underface, the stringers being fixed to the wing structure underface at points distal the pivot mounting location, and means for intermittently engaging the push member to biasingly deflect it from a normal rest position thereof toward the wing structure underface and therewith transmit upward flexing movement to the wing parts, on a release of engagement of said means with said push member, biased condition of the push member returning it to rest position during which downward flexing movement is transmitted to the wing parts for completing a cycle of oscillation of said wing parts.

2. The apparatus of claim 1 in which the resilient push member engaging means comprises a rotary cam member having at least one camming surface which in a rotation of the cam member engages the push member to deflect it from normal rest position, the cam member having at least one dwell surface thereon wherein the cam member is disengaged with said push member.

3. The apparatus of claim 2 in which the rotary member has at least another camming surface and at least another camming dwell surface so that in a rotation of the cam member at least two discrete complete cycles of oscillation of the wing parts occurs.

4. The apparatus of claim 3 in which said one and said at least another camming surfaces effect different magnitudes of deflection of said resilient push member to correspondingly produce different amplitudes of oscillations of said wing parts.

5. The apparatus of claim 1 in which the midlength part of the push member is a flat relatively thin component which in rest position of said push member disposes generally parallel codirectional in facing relation with the wing structure underface and symmetrically of the pivot mounting location, the stringers extending upwardly angularly away from the midlength part to points where they are fixed to the wing parts.

6. The apparatus of claim 1 in which the wing structure is pivot mounted to the lure body at a side marginal area of the wing structure.

7. The apparatus of claim 1 in which the wing structure is provided with a laterally sideways extending tab at one side of the wing, the tab being cantilever mounted to the lure body.

8. The apparatus of claim 1 in which the means for intermittently engaging the push member comprises a rotary cam, the rotary cam being carried on a shaft rotatably supported in the lure body, and drive means carried in the lure body for rotating the drive shaft.

9. The apparatus of claim 1 in which the drive means for rotating the drive shaft includes a drive motor.

10. The apparatus of claim 9 in which the drive means is an electrically powered motor, the drive means including a source of electric power in circuit with the drive motor.

11. The apparatus of claim 10 including an interrupter in circuit with the electric power source and the drive motor for periodically interrupting a supply of electric power from said source to said drive motor.

12. The apparatus of claim 1 in which said wing structure and said push member are of one of a metallic sheet material and a thermoplastic sheet material.

13. The apparatus of claim 12 in which the metallic sheet material has a thickness of about 0.005".

14. The apparatus of claim 13 in which the metallic sheet material is phosphorous bronze.

15. The apparatus of claim 12 in which the thermoplastic sheet material has a thickness of about 0.010" to about 0.015".

16. The apparatus of claim 15 in which the thermoplastic sheet material is polypropylene.

17. Apparatus for flexing wings of an insect like fishing lure, the wings being pivot mounted on a lure body, the apparatus including a resilient push member disposed below the wings and having a flat, thin midlength part disposed symmetrically of the pivot mounting and in a rest position thereof parallel to a horizontal datum, there being extension pieces extending from merger with opposite ends of the midlength part upwardly therefrom to a fixed connection of tip ends of each with under surfaces of the wings, an upward deflection force applied to the midlength part bowing said midlength upwardly counter to a bias thereof from rest a position shortening a horizontal span distance relative to said horizontal datum of points where the extension pieces merge from the opposite ends of the midlength part, said horizontal span distance shortening of said points being effective to transmit pivoting force to the wing parts for pivoting them upwardly, on a release of the deflection force the bias restoring the midlength part to rest position accompanied by downward flexing of the wing parts to complete an oscillation cycle of the wing parts.

* * * * *